United States Patent
Li et al.

(10) Patent No.: US 8,718,648 B2
(45) Date of Patent: *May 6, 2014

(54) SYSTEM, METHOD AND BASE STATION SUBSYSTEM FOR REALIZING HANDOVER IN LOCAL SWITCH

(75) Inventors: Jing Li, Shenzhen (CN); Xinhui Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/581,639

(22) PCT Filed: Apr. 15, 2011

(86) PCT No.: PCT/CN2011/072858
§ 371 (c)(1),
(2), (4) Date: Aug. 29, 2012

(87) PCT Pub. No.: WO2011/134354
PCT Pub. Date: Nov. 3, 2011

(65) Prior Publication Data
US 2013/0040646 A1   Feb. 14, 2013

(30) Foreign Application Priority Data
Apr. 30, 2010 (CN) .......................... 2010 1 0165403

(51) Int. Cl.
*H04W 36/00* (2009.01)
(52) U.S. Cl.
USPC ............ 455/436; 455/439; 455/438; 370/331
(58) Field of Classification Search
USPC ............................ 455/436, 439, 438; 370/331
See application file for complete search history.

(56) References Cited

U.S. PATENT DOCUMENTS

| 7,430,419 | B2 * | 9/2008 | Gureshnik et al. ............. 455/436 |
| 8,503,393 | B2 * | 8/2013 | Vesterinen .................... 370/331 |

(Continued)

FOREIGN PATENT DOCUMENTS

| CN | 1423912 A | 6/2003 |
| CN | 101180843 A | 5/2008 |

(Continued)

OTHER PUBLICATIONS

International Search Report dated Jul. 21, 2011 of PCT/CN2011/072858.

(Continued)

*Primary Examiner* — Danh Le
(74) *Attorney, Agent, or Firm* — Banner & Witcoff, Ltd.

(57) ABSTRACT

The present invention discloses a method for implementing a handover in a local switch, and the method includes: a core network transmitting indication information to a source base station subsystem during any terminal of communication parties which carries out a local switch is performing a base station subsystem handover, and the source base station subsystem determining whether to transmit user-plane speech data received from a media gateway to the terminal which has not performed the base station subsystem handover, or to transmit the user-plane speech data received from an internal link to the terminal which has not performed the base station subsystem handover, according to the indication information. The present invention also discloses a system for implementing a handover in a local switch as well as a base station subsystem.

24 Claims, 3 Drawing Sheets

(56) References Cited

U.S. PATENT DOCUMENTS

| | | | |
|---|---|---|---|
| 2003/0206530 A1* | 11/2003 | Lindsay et al. | 370/277 |
| 2005/0105559 A1 | 5/2005 | Cain et al. | |
| 2010/0195621 A1* | 8/2010 | Kekki et al. | 370/332 |
| 2010/0208658 A1* | 8/2010 | Vesterinen | 370/328 |
| 2012/0135718 A1* | 5/2012 | Amidon et al. | 455/414.1 |
| 2012/0135744 A1* | 5/2012 | Curtis et al. | 455/456.1 |
| 2012/0149377 A1* | 6/2012 | Su et al. | 455/438 |
| 2012/0320877 A1* | 12/2012 | Li et al. | 370/331 |

FOREIGN PATENT DOCUMENTS

| | | |
|---|---|---|
| CN | 101185299 A | 5/2008 |
| CN | 101374355 A | 2/2009 |
| CN | 101159905 A | 4/2009 |
| CN | 101577948 A | 11/2009 |
| CN | 101801046 A | 8/2010 |
| CN | 101835218 A | 9/2010 |
| CN | 101835219 A | 9/2010 |
| CN | 101835220 A | 9/2010 |
| CN | 101860926 A | 10/2010 |

OTHER PUBLICATIONS

International Search Report dated Jul. 1, 2011 of PCT/CN2011/072858.

* cited by examiner

SYSTEM, METHOD AND BASE STATION SUBSYSTEM FOR REALIZING HANDOVER IN LOCAL SWITCH

TECHNICAL FIELD

The present invention relates to the mobile communication field, and in particular, to a system, method and a base station subsystem for implementing a handover in a local switch.

BACKGROUND OF THE RELATED ART

In the existing Global System for Mobile Communications (referred to as GSM) system, A interface is adopted to communicate between a Mobile Switching Center Server (referred to as MSC Server) and a Base Station Controller (referred to as BSC), while a Mobile Terminal (referred to as MS) communicates with a Base Transceiver Station (referred to as BTS) via an air interface of Um interface. In addition, the BTS is connected with BCS via an Abis interface. Additionally, a Base Station Subsystem (referred to as BSS) composed of the BSC and BTS, as well as the MSC and MGW are all one part of a Core Network (referred to as CN).

At present, in a calling and called process of the GSM system, a user-plane speech of a caller party is transferred to a Media Gateway (referred to as MGW) via the BSS, and then is transferred to the BSS of an opposite party by the MGW, even if the two parties of a call are in the same BSS. However, there are a large number of local calls in an actual GSM network, that is the two parties of the call are in the same BSS, or belong to the different BTSs of the same BTS cluster, or belong to the same BSC. For the local calls, the following questions will appear if the current call handling process is followed.

For calls belonging to the same BTS, the case that a user-plane speech of a caller party is transferred to the BSC via the Abis interface of the BTS, the BSC transfers the user-plane speech to the MGW via the A interface, the MGW transfers the user-plane speech to the original BSC via the A interface, and then the original BSC transfers the user-plane speech to the original BTS will occur, thus resulting in the loss of transmission resources between the Abis interface and the A interface.

For calls belonging to the different BTSs of the same BTS cluster, the case that a user-plane speech of a caller party is transferred to the BTS controlled by the BTS cluster via the Abis interface of the BTS, the controlled BTS transfers the user-plane speech to the BSC via Abis interface of the BTS, the BSC transfers the user-plane speech to the MGW via the A interface, the MGW transfers the user-plane speech to the original BSC via the A interface, the original BSC transfers the user-plane speech to the above controlled BTS, and then the above controlled BTS transfers the user-plane speech to the original BTS will occur, thus resulting in the loss of transmission resources of the Abis interface between the above controlled BTS and the BSC, as well as the loss of transmission resources of the A interface.

As shown in FIG. 1, for calls belonging to the same BSC, the case that the BSC transfers a user-plane speech to the MGW via the A interface at first, and then the MGW transfers the user-plane speech to the BSC via the A interface will occur, thus resulting in the loss of transmission resources of the A interface.

In order to avoid the loss of the type of the transmission resources, a local switch function is provided. The local switch function refers to a function for switching voice data of two parties through BSS, and the switch of the user-plane speech of the two parties is performed by the BSS for the two parties of the call under the same BSS, just as shown in FIG. 2.

However, if one party of the call needs to perform the handover after using the local switch, such as needing to perform the handover from the original BSC to another BSC, the two parties of the call are no longer provided with services by the same BSC, therefore the local switch function will no longer continue to be used.

When a call using the local switch function needs to perform the handover, the method adopted by the existing scheme is to stop using the local switch at first, to restore the mode for switching through the core network, and then to perform the handover in accordance with the existing handover process, as shown in FIG. 3. However, the method requires releasing the local switch at first, and then executes the handover, thus delaying the handover time. At the same time, the local switch is also required to be established again if the handover fails.

SUMMARY OF THE INVENTION

The inventors of the present invention find that: if a handover function is directly adopted for users taking advantage of the local switch, there are two user-plane links (an internal link of the local switch and a link connected with the MGW) simultaneously, for one party performing the handover, only one of the two links is valid at a certain time during the handover process, and the BSS transmits user-plane speech data received from one link to a Mobile Terminal (referred to as MS) which has not performed the handover. However the BSS can't judge which link is valid, therefore a problem that the BSS doesn't know from which link the user-plane speech data is received to be transmitted to the MS will appear, during the handover process, so that the handover function cannot be used directly when the local switch is performed.

The technical problem to be solved by the present invention is to provide a system, method and base station subsystem for implementing a handover in a local switch, so as to realize that a source BSS can accurately determine a valid link during a terminal performs a BSS handover, so that the handover function can be used directly when the local switch is performed.

The present invention provides a method for implementing a handover in a local switch, comprising:

a core network transmitting indication information to a source base station subsystem during any terminal of communication parties carrying out the local switch is performing a base station subsystem handover, and the source base station subsystem determining whether to transmit user-plane speech data received from a media gateway to the terminal which has not performed the base station subsystem handover, or to transmit the user-plane speech data received from an internal link to the terminal which has not performed the base station subsystem handover, according to the indication information.

Wherein:

the indication information transmitted by the core network to the source base station subsystem is used to indicate whether the base station subsystem handover is completed or not, that is to indicate whether the speech data received by the source base station subsystem from the media gateway is valid or not.

Wherein:

the indication information is a user-plane speech frame, the media gateway in the core network indicates whether user-plane data on a link between the source base station subsystem and the media gateway is valid or not through different speech frame types Wherein:

the indication information is an indication identification, and the indication identification indicates whether user-plane data on a link between the source base station subsystem and the media gateway is valid or not through different values.

Wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

The present invention also provides a system for implementing a handover in a local switch, comprising a base station subsystem and a core network, the core network comprising a media gateway; wherein:

the core network is configured to transmit indication information to a source base station subsystem during any terminal of communication parties carrying out a local switch is performing a base station subsystem handover;

the source base station subsystem is configured to determine whether to transmit user-plane speech data received from a media gateway to the terminal which has not performed the base station subsystem handover, or to transmit the user-plane speech data received from an internal link to the terminal which has not performed the base station subsystem handover, according to the indication information.

Wherein:

the indication information transmitted by the core network to the source base station subsystem is used to indicate whether the base station subsystem handover is completed or not, that is to indicate whether the speech data received by the source base station subsystem from the media gateway is valid or not.

Wherein:

the indication information is a user-plane speech frame, the media gateway indicates whether user-plane data on a link between the source base station subsystem and the media gateway is valid or not through different speech frame types.

Wherein:

the indication information is an indication identification, and the indication identification indicates whether user-plane data on a link between the source base station subsystem and the media gateway is valid or not through different values.

Wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

The present invention also provides a base station subsystem in a local switch, the base station subsystem being a source base station subsystem during any terminal of communication parties carrying out a local switch is performing a base station subsystem handover; and the source base station subsystem being configured to:

receive indication information sent by a core network to the source base station subsystem during any terminal of the communication parties carrying out the local switch is performing the base station subsystem handover; and determine whether to transmit user-plane speech data received from a media gateway to the terminal which has not performed the base station subsystem handover, or to transmit the user-plane speech data received from an internal link to the terminal which has not performed the base station subsystem handover, according to the indication information.

Wherein:

the indication information is used to indicate whether the base station subsystem handover is completed or not, that is to indicate whether the speech data received by the source base station subsystem from the media gateway is valid or not.

Wherein:

the indication information is a user-plane speech frame, the media gateway in the core network indicates whether user-plane data on a link between the source base station subsystem and the media gateway is valid or not through different speech frame types.

Wherein:

the indication information is an indication identification, and the indication identification indicates whether user-plane data on a link between the source base station subsystem and the media gateway is valid or not through different values.

Wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

In summary, the present invention provides a system, method and base station subsystem for implementing a handover in a local switch, so as to realize that a source BSS can accurately determine valid user-plane speech data during a terminal is performing a BSS handover, therefore the BSS handover of the terminal is accomplished while realizing the local switch, thus effectively avoiding the loss of speech data.

PREFERRED EMBODIMENTS OF THE PRESENT INVENTION

Figure 1:
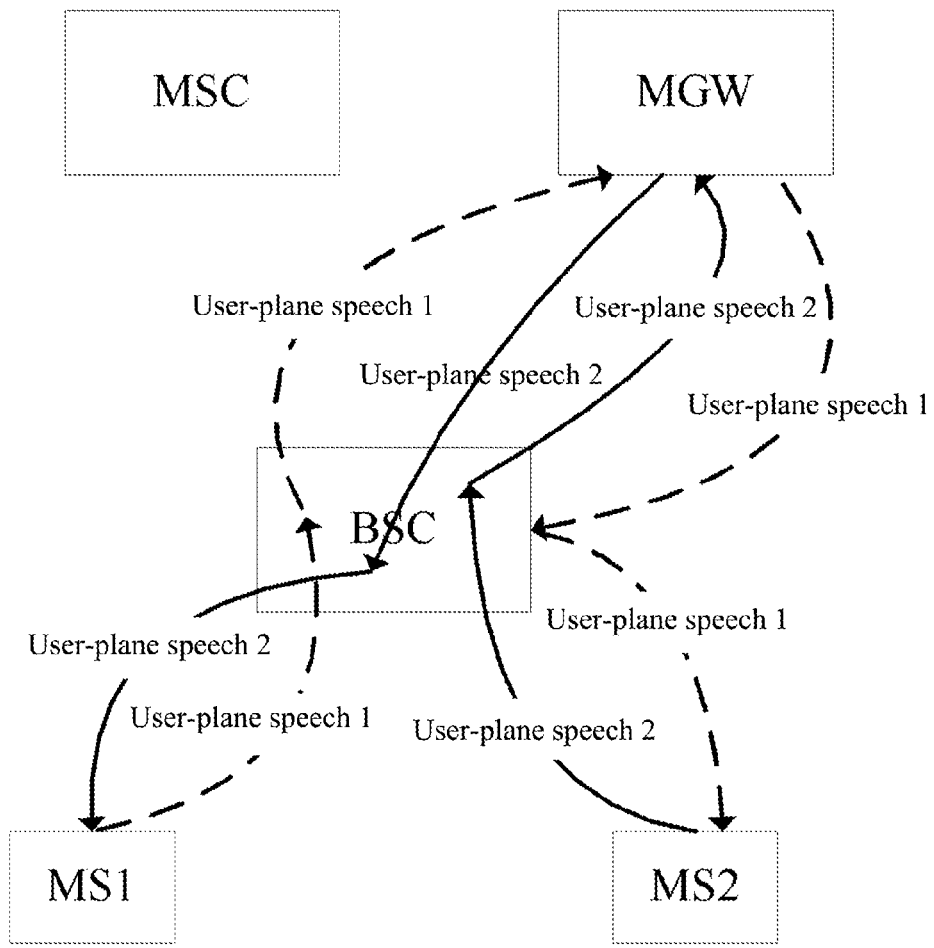
FIG. 1 is a schematic diagram of a user-plane speech transmission among a MS, BSC and MGW in the related art.
Figure 2:
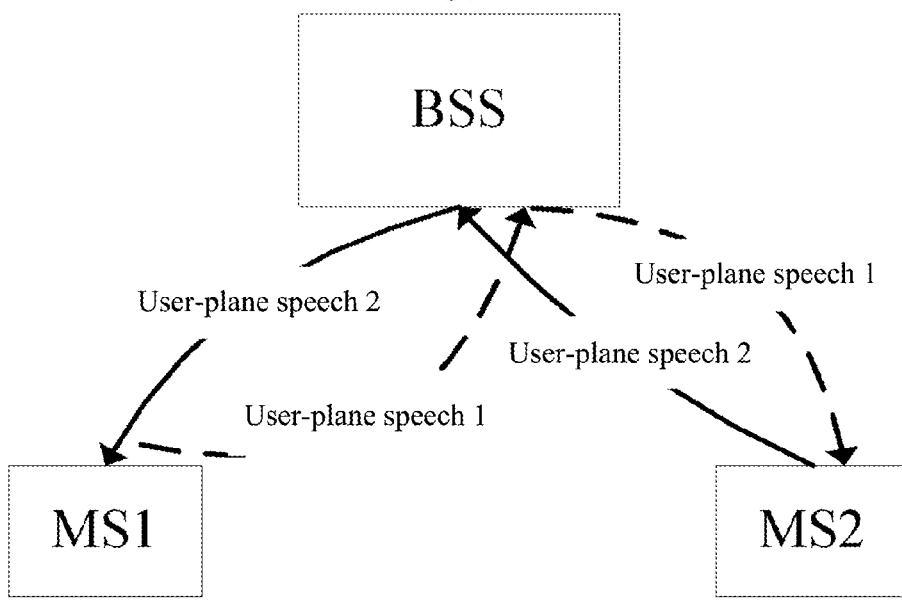
FIG. 2 is a schematic diagram of a user-plane speech transmission among a MS, BSS and MGW after implementing a local switch, wherein speech data is not transmitted to a core network.
Figure 3:
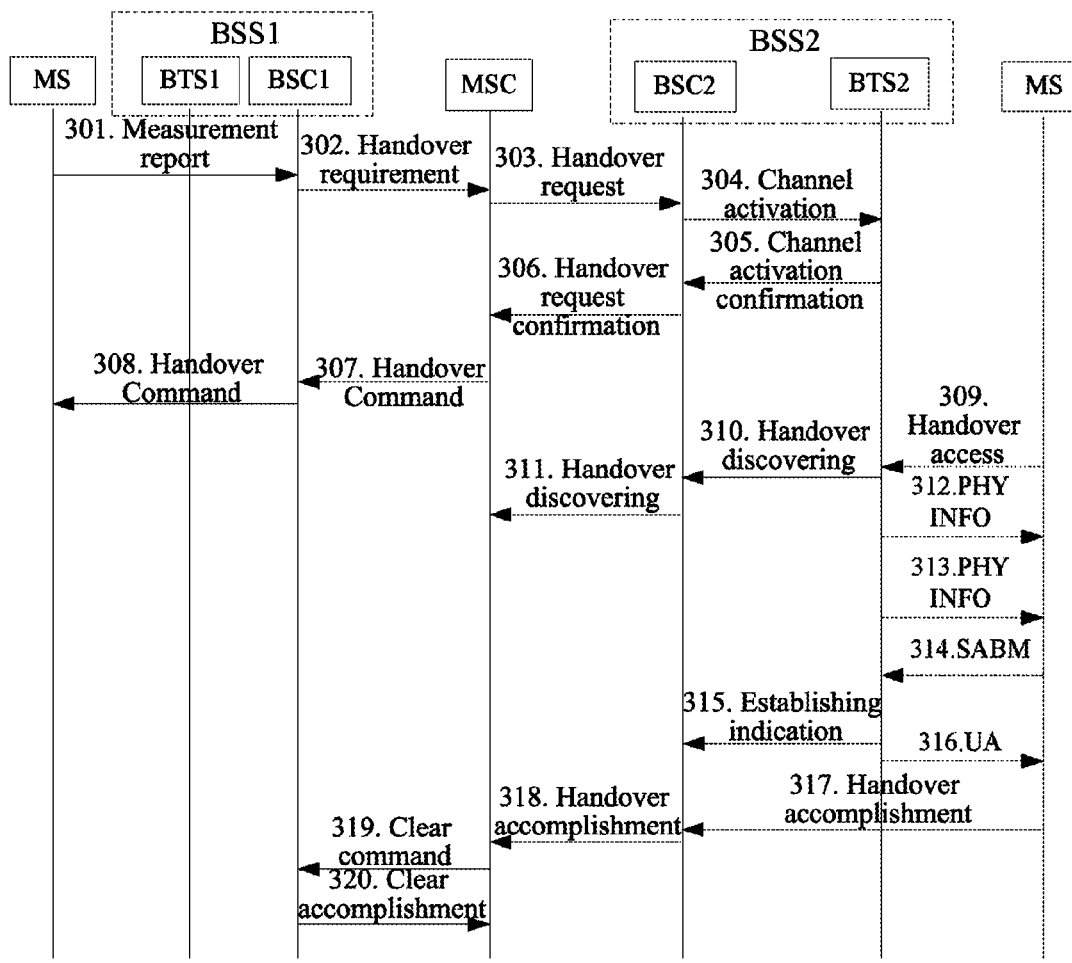
FIG. 3 is a signaling schematic diagram of a handover process in the related art.

In order to make the purpose, technical scheme and advantages of the present invention more clearly understood, embodiments of the present invention will be illustrated in detail in combination with accompanying drawings hereinafter. It should be noted that the embodiments of the present invention and characteristics of the embodiments can be in any combination with each other in the case of no conflict.

According to a method for processing a local call as well as a mobile communication system of the present invention, after a local switch function is adopted, if a certain terminal of communication parties of a call needs to perform the handover, a BSS is required to judge whether the data received from a MGW is a mute frame or not after sending a Handover Command to a mobile phone, besides executing the handover process defined in the existing specification.

The embodiment provides a system for implementing a handover in a local switch, and the system comprises a BSS, as well as a core network which comprises a MGW;

the core network is configured: to transmit indication information to a source BSS during any terminal of communication parties which carries out a local switch is performing a BSS handover; the indication information is used to indicate whether the BSS handover is completed or not, that is to indicate whether the user-plane speech data received by the source BSS from the MGW is valid or not.

The indication information may be an indication identification, which is identified with different values before the handover is completed and after the handover is completed, that is which indicates whether the user-plane data on the link between the source BSS and the MGW is valid or not through the different values;

the indication information may also be a user-plane speech frame, the MGW indicates whether the user-plane data on the link between the source BSS and the MGW is valid or not through different speech frame types, for example a mute frame is transmitted before the handover is completed and a non-mute frame is transmitted after the handover is completed.

The MS have not completed the handover if the core network does not receive the user-plane speech data transmitted by a handover destination BSS, and the indication information transmitted by the core network before the handover is completed can be sent periodically, such as every 160 ms.

The BSS is configured: to transmit a Handover Command to a MS (mobile terminal) which needs to perform the handover after receiving the Handover Command sent by the MSC; and to transmit the valid user-plane speech data to other MS which has not performed the handover during the MS is performing the handover; wherein, the BSS refers to the source BSS when the terminal performs the handover.

Furthermore, the BSS judge whether the received user-plane speech data sent from the MGW is valid or not according to the indication information sent by the core network; if the core network sends the indication identification, it is judged whether the user-plane speech data sent from the core network is valid or not according to the value of the indication identification, and if the MGW sends the user-plane speech frame, it is judged whether the user-plane speech data sent from the MGW is valid or not according to the speech frame type. The user-plane speech data received from an internal link is transmitted to the MS which has not performed the handover when it is judged that the user-plane speech data sent from the MGW is invalid, and the user-plane speech data sent from the MGW is transmitted to the other MS which has not performed the handover when it is judged that the user-plane speech data sent from the MGW is valid.

Figure 4:
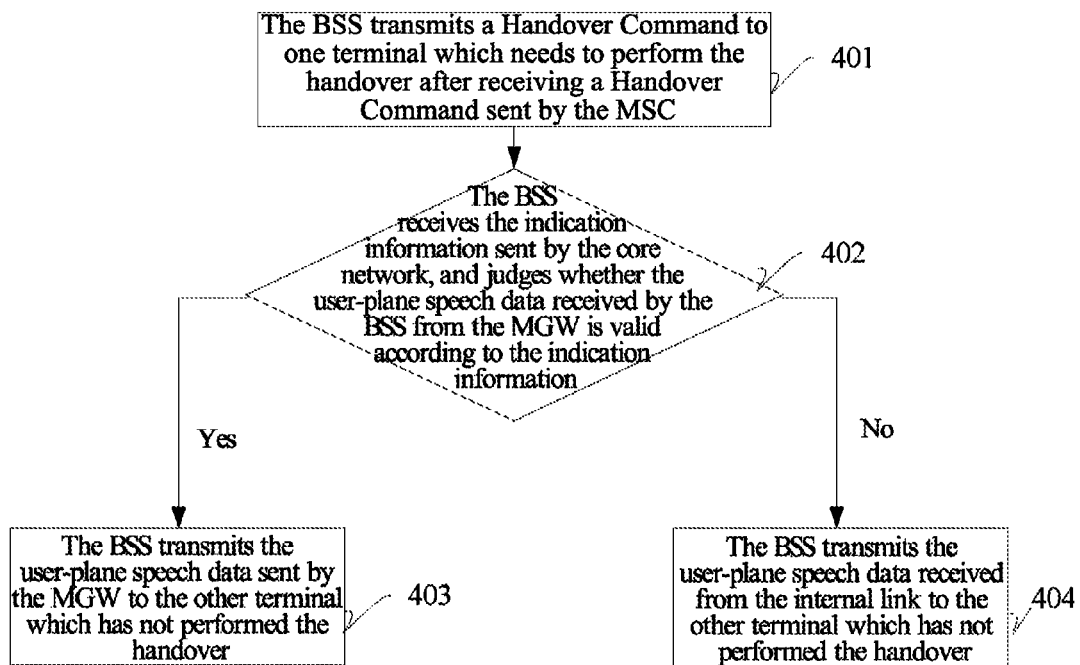
FIG. 4 is a flow chart of a method embodiment of the present invention.

The embodiment provides a method for implementing a handover in a local switch, assuming that some MS of communication parties which performs the local switch needs to perform a BSS handover, as shown in FIG. 4, and the method comprises the following steps.

In step 401: the BSS transmits a Handover Command to one MS (mobile terminal) which needs to perform the handover after receiving a Handover Command sent by the MSC;

the core network transmits indication information to the source BSS before not receiving user-plane speech data sent by the handover destination BSS, and the indication information is used to indicate whether the terminal completes the BSS handover or not, that is to indicate whether the user-plane speech data received by the source BSS from the core network is valid or not;

the indication information may be an indication identification, which is identified with different values before the handover is completed and after the handover is completed; the indication information may also be a user-plane speech frame, the MGW in the core network indicates whether the user-plane data on the link between the source base station subsystem and the media gateway is valid or not through different speech frame types, for example a mute frame is transmitted before the handover is completed and a non-mute frame is transmitted after the handover is completed;

the indication information can be sent to the BSS periodically, such as every 160 ms.

In step 402: the BSS receives the indication information sent by the core network, and judges whether the user-plane speech data received from the user-plane speech link between the BSS and the MGW is valid or not according to the indication information, that is whether the MS completes the handover or not; if valid proceed to step 403; otherwise skip to step 404.

In the step, if the indication information received by the BSS is an indication identification, it is judged whether the user-plane speech data received from the user-plane speech link between the BSS and the MGW is valid or not according to the value of the indication identification; and if it is a user-plane speech frame that the MGW transmits, it is judged whether the user-plane speech data received from the user-plane speech link between the BSS and the MGW is valid or not according to the speech frame type.

For example, the user-plane speech data transmitted by the MGW is a mute frame, which indicates that the user-plane speech data received from the user-plane speech link between the BSS and the MGW is invalid, that is the BSS handover has not completed; and if the user-plane speech data received by the BSS from the MGW is a non-mute frame, it is indicated that the user-plane speech data received from the user-plane speech link between the BSS and the MGW is valid, that is the BSS handover has completed.

In step 403, the BSS transmits the user-plane speech data sent by the MGW to the MS which has not performed the handover.

In step 404, the BSS transmits the user-plane speech data received from the internal link to the other MS which has not performed the handover.

The BSS stops the local switch function simultaneously, besides releasing the resources originally used by the handover user, when the BSS receives a clear command sent by the MSC.

The embodiment also provides a base station subsystem in a local switch, and the base station subsystem refers to a source base station subsystem during any terminal of communication parties, which carries out the local switch, is performing the base station subsystem handover. The source base station subsystem is configured to:

receive indication information sent by the core network to a source base station subsystem during any terminal of the communication parties which carries out the local switch is performing the base station subsystem handover; and determine whether to transmit user-plane speech data received from a media gateway to the terminal which has not performed the base station subsystem handover, or to transmit the user-plane speech data received from an internal link to the terminal which has not performed the base station subsystem handover, according to the indication information.

Wherein:

the indication information is used to indicate whether the base station subsystem handover is completed or not, that is to indicate whether the speech data received by the source base station subsystem from the media gateway is valid or not.

Wherein:

the indication information is an indication identification, which indicates whether the user-plane data on the link between the source base station subsystem and the media gateway is valid or not through different values.

Alternatively, the indication information is a user-plane speech frame, the media gateway in the core network indicates whether the user-plane data on the link between the source base station subsystem and the media gateway is valid or not through different speech frame types.

Wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

Those skilled in the art should understand that all or parts of steps of the aforementioned method can be completed by programs instructing the corresponding hardware, and the programs might be stored in a computer readable storage medium, such as a read-only memory, a disk, or a CD-ROM and so on. Alternatively, all or parts of steps of the aforementioned embodiments can be implemented with one or more integrated circuits. Correspondingly, each module or unit can be implemented in the form of hardware, as well as software functional modules. The present invention is not limited to any specific combinations of hardware and software.

Of course, the present invention further comprises a plurality of other embodiments; those skilled in the art may make various corresponding modifications and variations according to the present invention, without departing from the spirit and essence of the present invention, however, all the corresponding modifications and variations should belong to the protection scope of the appended claims of the present invention.

INDUSTRIAL APPLICABILITY

The present invention provides a system, method and base station subsystem for implementing a handover in a local switch, so as to realize that a source BSS can accurately determine valid user-plane speech data during a terminal is performing a BSS handover, therefore the BSS handover of the terminal is accomplished while implementing the local switch, thus effectively avoiding the loss of speech data.

What is claimed is:

1. A method for implementing a handover in a local switch, comprising:
a core network transmitting indication information to a source base station subsystem during any terminal of communication parties carrying out the local switch is performing a base station subsystem handover, and the source base station subsystem determining whether to transmit user-plane speech data received from a media gateway to the terminal which has not performed the base station subsystem handover, or to transmit the user-plane speech data received from an internal link to the terminal which has not performed the base station subsystem handover, according to the indication information.

2. The method of claim 1, wherein:
the indication information transmitted by the core network to the source base station subsystem is used to indicate whether the base station subsystem handover is completed or not, that is to indicate whether the speech data received by the source base station subsystem from the media gateway is valid or not.

3. The method of claim 2, wherein:
the indication information is a user-plane speech frame, the media gateway in the core network indicates whether user-plane data on a link between the source base station subsystem and the media gateway is valid or not through different speech frame types.

4. The method of claim 3, wherein:
the user-plane speech frame transmitted by the media gateway to the base station subsystem is a mute frame before the handover is completed, and the user-plane speech frame transmitted by the media gateway to the base station subsystem is a non-mute frame after the handover is completed.

5. The method of claim 2, wherein:
the indication information is an indication identification, and the indication identification indicates whether user-plane data on a link between the source base station subsystem and the media gateway is valid or not through different values.

6. The method of claim 1, wherein:
the indication information is a user-plane speech frame, the media gateway in the core network indicates whether user-plane data on a link between the source base station subsystem and the media gateway is valid or not through different speech frame types.

7. The method of claim 6, wherein:
the user-plane speech frame transmitted by the media gateway to the base station subsystem is a mute frame before the handover is completed, and the user-plane speech frame transmitted by the media gateway to the base station subsystem is a non-mute frame after the handover is completed.

8. The method of claim 1, wherein:
the indication information is an indication identification, and the indication identification indicates whether user-plane data on a link between the source base station subsystem and the media gateway is valid or not through different values.

9. A system for implementing a handover in a local switch, comprising a base station subsystem and a core network, the core network comprising a media gateway;
wherein:
the core network is configured to transmit indication information to a source base station subsystem during any terminal of communication parties carrying out a local switch is performing a base station subsystem handover;
the source base station subsystem is configured to determine whether to transmit user-plane speech data received from a media gateway to the terminal which has not performed the base station subsystem handover, or to transmit the user-plane speech data received from an internal link to the terminal which has not performed the base station subsystem handover, according to the indication information.

10. The system of claim 9, wherein:
the indication information transmitted by the core network to the source base station subsystem is used to indicate whether the base station subsystem handover is completed or not, that is to indicate whether the speech data received by the source base station subsystem from the media gateway is valid or not.

11. The system of claim 10, wherein:
the indication information is a user-plane speech frame, the media gateway indicates whether user-plane data on a link between the source base station subsystem and the media gateway is valid or not through different speech frame types.

12. The system of claim 11, wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

13. The system of claim 10, wherein:

the indication information is an indication identification, and the indication identification indicates whether user-plane data on a link between the source base station subsystem and the media gateway is valid or not through different values.

14. The system of claim 9, wherein:

the indication information is a user-plane speech frame, the media gateway indicates whether user-plane data on a link between the source base station subsystem and the media gateway is valid or not through different speech frame types.

15. The system of claim 14, wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

16. The system of claim 9, wherein:

the indication information is an indication identification, and the indication identification indicates whether user-plane data on a link between the source base station subsystem and the media gateway is valid or not through different values.

17. A base station subsystem in a local switch, the base station subsystem being a source base station subsystem during any terminal of communication parties carrying out a local switch is performing a base station subsystem handover; and the source base station subsystem being configured to:

receive indication information sent by a core network to the source base station subsystem during any terminal of the communication parties carrying out the local switch is performing the base station subsystem handover; and determine whether to transmit user-plane speech data received from a media gateway to the terminal which has not performed the base station subsystem handover, or to transmit the user-plane speech data received from an internal link to the terminal which has not performed the base station subsystem handover, according to the indication information.

18. The base station subsystem of claim 17, wherein:

the indication information is used to indicate whether the base station subsystem handover is completed or not, that is to indicate whether the speech data received by the source base station subsystem from the media gateway is valid or not.

19. The base station subsystem of claim 18, wherein:

the indication information is a user-plane speech frame, the media gateway in the core network indicates whether user-plane data on a link between the source base station subsystem and the media gateway is valid or not through different speech frame types.

20. The base station subsystem of claim 19, wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

21. The base station subsystem of claim 18, wherein:

the indication information is an indication identification, and the indication identification indicates whether user-plane data on a link between the source base station subsystem and the media gateway is valid or not through different values.

22. The base station subsystem of claim 17, wherein:

the indication information is a user-plane speech frame, the media gateway in the core network indicates whether user-plane data on a link between the source base station subsystem and the media gateway is valid or not through different speech frame types.

23. The base station subsystem of claim 22, wherein:

the user-plane speech frame transmitted by the media gateway to the base station subsystem is a mute frame before the handover is completed, and the user-plane speech frame transmitted by the media gateway to the base station subsystem is a non-mute frame after the handover is completed.

24. The base station subsystem of claim 17, wherein:

the indication information is an indication identification, and the indication identification indicates whether user-plane data on a link between the source base station subsystem and the media gateway is valid or not through different values.

* * * * *